Dec. 26, 1961 H. H. MORSE 3,014,238
MEANS FOR FORMING CONTINUOUS SELF-SUPPORTING
LENGTHS OF COMPACTED MATERIAL
Filed Nov. 19, 1958 3 Sheets-Sheet 2
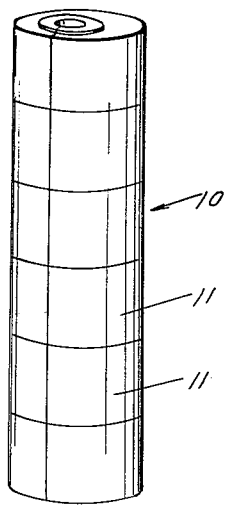
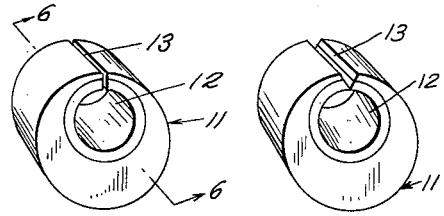
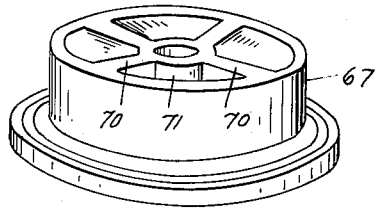
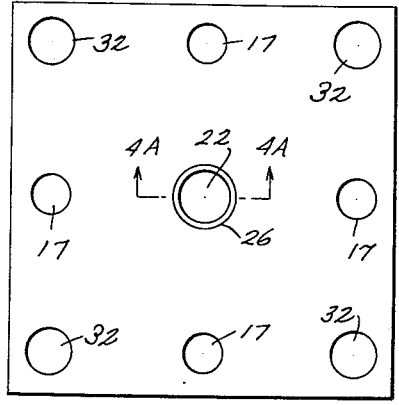
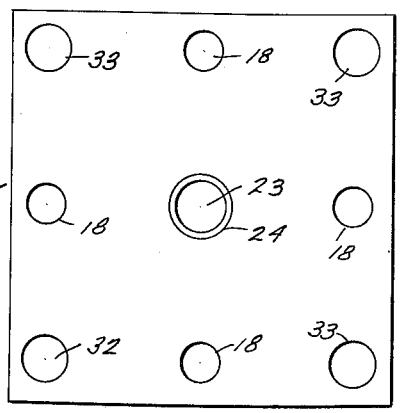
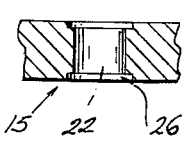
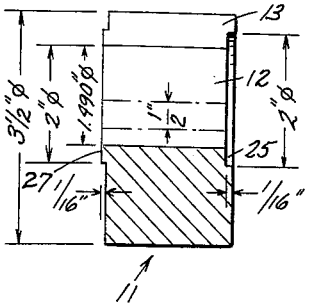
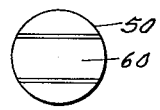
INVENTOR.
HAROLD H. MORSE

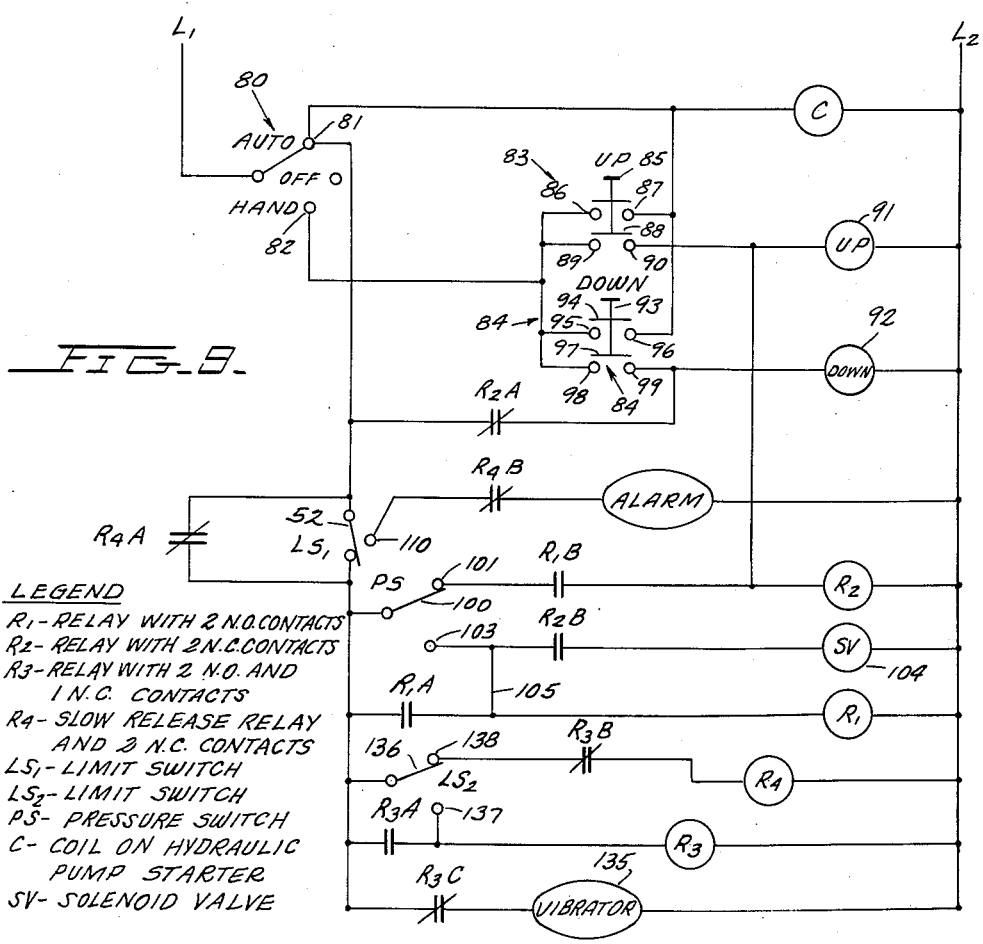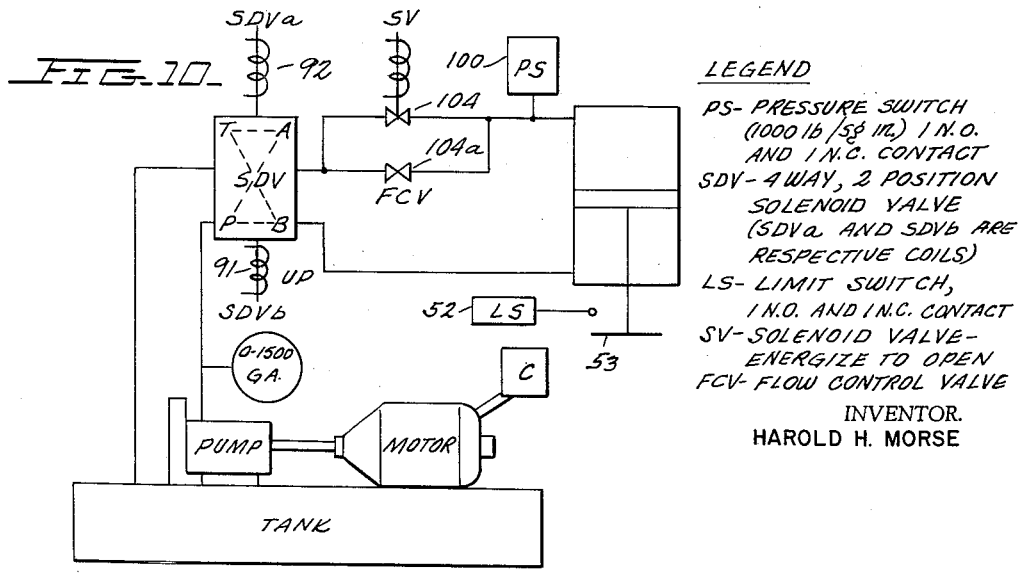

United States Patent Office

3,014,238
Patented Dec. 26, 1961

3,014,238
MEANS FOR FORMING CONTINUOUS SELF-SUPPORTING LENGTHS OF COMPACTED MATERIAL
Harold H. Morse, Mariemont, Ohio, assignor to National Distillers and Chemical Corporation, New York, N.Y., a corporation of Virginia
Filed Nov. 19, 1958, Ser. No. 775,085
6 Claims. (Cl. 18—12)

The present invention relates to apparatus for forming continuous integrated self-supporting rods, bars and lengths of compacted material including dies and an appropriately shaped plunger for forming said rods, bars and lengths while simultaneously integrating them.

More specifically this invention contemplates a die in which successive increments of material to be compacted are successively compressed by a plunger against the frictional force between the side of the die and the already compacted material as well as against the additional frictional force exerted by the die against the last increment being compacted. Since the die is held rigidly stationary, at the point of desired compactness, the entire mass begins to slide in the die thereby providing a signal resulting from the decreased resistance to the movement of the plunger which signal is used to reverse the plunger and move it out of the die to permit the next increment of material to be added to the compact to be inserted in the die.

The compacted material emerges as a continuous rod, bar or length from the other end of the die, its emergent movement being step by step in accordance with successive plunger operations on successive increments.

An important object of this invention therefore is the provision of a novel means for compacting successive increments of material to produce a continuous rod, bar or length in a stationary die utilizing, as the source for an opposing force to the compacting plunger, the frictional engagement of the side of the die with the side of the compacted material as well as with the last increment of material being compacted.

This invention also contemplates the shaping of the operative face of the compressing plunger to provide increased interengaging areas between the top of the last compacted segment and the next increment and to interlock the last increment with the remainder of the compact. The particular shape may be a wedge as hereinafter shown, an inverted frustum of a cone or a right cylindrical member with considerable clearance between it and the die. More irregular surfaces will generally not produce any greater strength because corners or crevices then exist where the material sticks and the irregularities are soon filled.

A further important object of this invention, therefore, is the provision of means for producing a continuous rod, bar or length of compacted material which will be self-supporting without the need for sintering or other operations to make it self-supporting as it is formed.

Other objects of the invention include novel means for applying special formations to the continuous rod or length such as screw threads at the ends or other portions thereof; simplified means for arranging the segments of the die and integrating them and means for controlling the compacting of the member at the initial stages of formation thereof.

The foregoing and many other objects of the invention will become apparent in the following description and drawings in which:

FIGURE 2 is a view in perspective of the die in the apparatus of FIGURE 1 showing the die made of a number of segments.

FIGURE 3 is a view in perspective of one of the die segments.

FIGURE 3A is a view in perspective of a modified form of die segment.

FIGURE 4 is a top plan view of the die clamp plate of FIGURE 1.

FIGURE 4A is a cross-sectional view taken on line 4A—4A of FIGURE 4 looking in the direction of the arrows.

FIGURE 5 is a plan view of the die support plate of FIGURE 1.

FIGURE 6 is a longitudinal cross-sectional view taken on line 6—6 of the die segment of FIGURE 3 looking in the direction of the arrows.

FIGURE 7 is a view in perspective of the guide member shown in position in FIGURE 1.

FIGURE 8 is a view of the face of the plunger taken from line 8—8 of FIGURE 1 looking in the direction of the arrows.

FIGURE 9 is a circuit diagram showing one type of electrical inter-connection for performing the operations descriped in connection with the apparatus of FIGURES 1–8.

Figure 1:
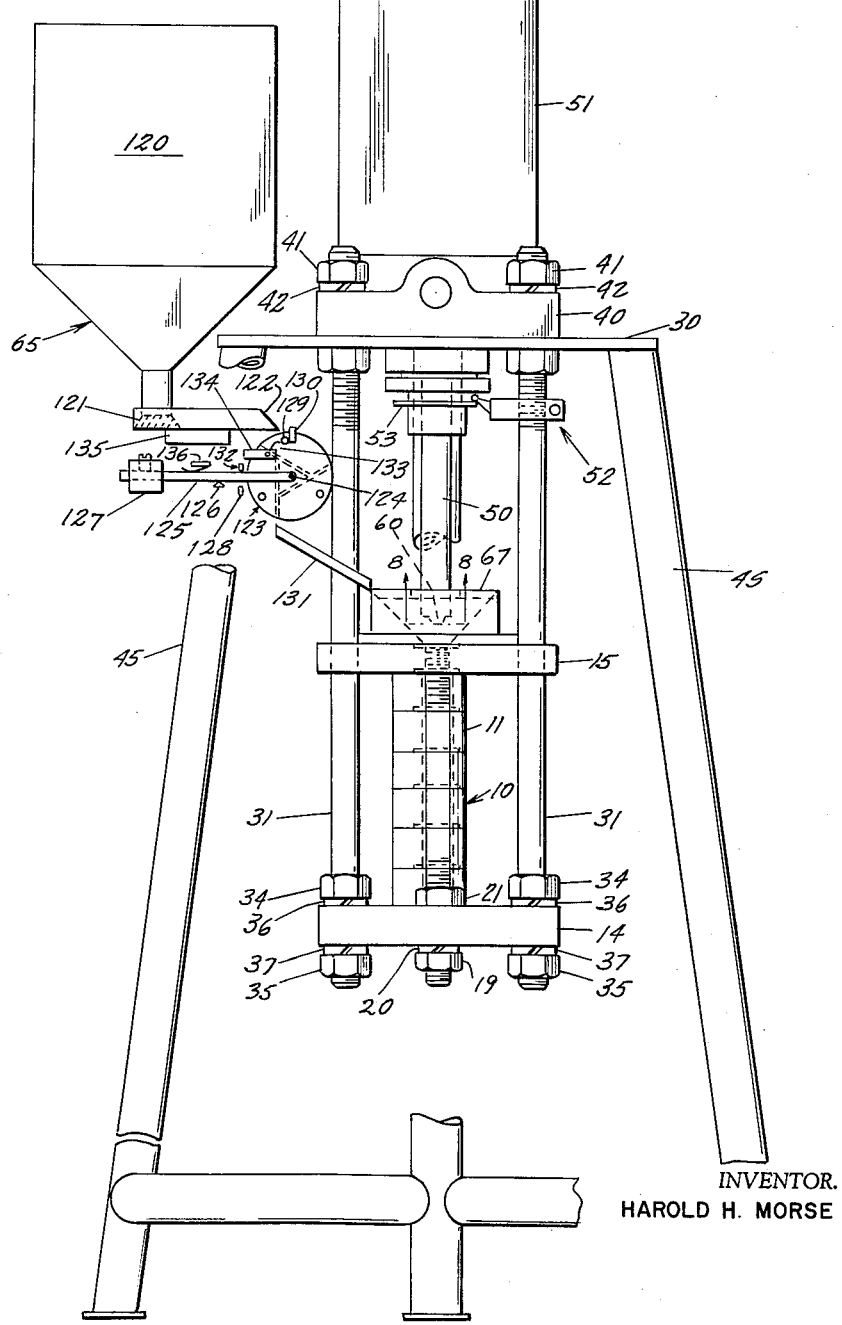
FIGURE 1 is an elevation of apparatus including the novel die and plunger for performing the operation of the present invention.

Referring first to FIGURE 1, the novel apparatus here shown comprises the compacting die 10. A single die of appropriate length may be used within the limits of die fabricating equipment. Under certain circumstances a die 10 having a plurality of segments 11 may be used. The die which in this case is shown as including a plurality of segments 11 is also shown in perspective in FIGURE 2, and an individual segment is shown in perspective in FIGURE 3 while a cross-section of the individual segment is shown in FIGURE 6. The die assembly 10 of FIGURES 1 and 2 consists of a stack of cylindrical plugs or segments 11 (FIGURES 3 and 6) of hardened steel (for instance 60 Rockwell C) each having a cylindrical hole 12 which is eccentrically located in the die segment. A longitudinal cut 13 is made in each segment at the point of minimum wall thickness. Since the metal of the die has some inherent resiliency, a cavity is thereby formed in which the cut 13 permits the cavity to have some spring action. By this means, therefore, a cavity is formed in which the material to be compressed, such as zirconium sponge, can be compressed with the die offering sufficient inherent spring action so that the friction of the compress with the wall of die would produce the necessary opposite force against which the plunger, hereinafter described, may act. By appropriate selections of inside and outside diameters together with the appropriate eccentric cylindrical surface the die interior 12 will become essentially cylindrical under pressure of the compact. It is for this reason that the dimensional markings on FIGURE 6 have been made to illustrate one form of such die segment in which the condition above mentioned is obtained. No provision need normally be made to prevent sponge from entering slit 13. Where desired, the slit 13 may be covered by a thin tape. In a modified form of the die, in lieu of the slit, a V-shaped slot may be cut to a depth such that the remaining material is only a few thousandths of an inch thin; this is then fractured, leaving a sharp edge which cuts away any material that would otherwise tend to pile up in the slit.

The plurality of die segments 11 forming the continuous die 10 with all of the eccentric holes 12 and the slits 13 aligned with each other are integrated in a single unit between the die support plate 14 (see also FIGURE 5) and the die clamping plate 15 (see also FIGURE 4). The die support plate 14 and the die clamping plate 15 are interconnected by the clamping bolts 16, which in this case are four in number, one on each side of the plates 14 and 15. The upper ends of each of the bolts 16 enter and are held in the threaded openings 17, 17 in the clamping plate 15 (see also FIGURE 4) and the lower ends of the bolts 16 extend through openings 18, 18 in the die support plate 14 (FIGURE 5) where they are drawn up tight by the nuts 19 working against the lock washers 20 and then are further locked in position by the positioning nuts 21.

The die clamping plate 15 is provided with a substantially central hole 22 which is aligned with the aligned openings 12 in the die assembly 10. The die support plate is provided with a similar hole 23 similarly aligned. The hole 23 in the die support plate is larger in diameter than the hole 12 in the lowest die segment 11 to provide for clearance. The hole 23 is provided with an annular aligning ridge 24 engaging the annular recess 25 in the lower face of the lowest die segment 11 to insure appropriate positioning of the die segment with the hole 23. Since the material to be compacted enters in sponge, pulverized or powder form at the top, the hole 22 in the die clamping plate 15 of FIGURE 4 need not necessarily be the same diameter as the aligned holes 12 of the die segments 11. In the particular construction, the hole 22 may actually be slightly smaller in diameter than the aligned holes 12.

The hole 22 of the die clamping plate 15 is provided with an annular recess 26 on its underside (FIGURE 4) to receive the annular positioning protrusion 27 at the upper end of the uppermost die segment 11, in order to align this uppermost die segment 11 with the opening 22. An additional recess is provided on top of die clamping plate 15 to align the funnel guide 67 (hereinafter described) by cooperating with a protrusion on the bottom surface of guide 67. It will be obvious from a comparison of FIGURES 2, 3 and 6 that the annular recess 25 at the lower end of each die segment 11 and the annular extensions 27 at the upper end of each die will serve to align the die segments 11 to form the continuous die 10.

The entire die assembly consisting of the interconnected die elements 11, die support plate 14, die clamping plate 15 and the bolts 16, which secure these elements together, are in turn secured to the main support plate 30 of the machine by the assembly bolts 31, 31, four of which are used in this instance. Each of the assembly bolts 31 passes through a pair of vertically aligned openings 32 in the die clamping plate 15 of FIGURE 4 and openings 33 in the die support plate 14 of FIGURE 5 to produce the integrated structure shown in FIGURE 1. These bolts 31 are secured at their lower ends at openings 33 in plate 14 by the nuts 34, 35 and the lock washers 36, 37. They pass through the openings 32 of plate 15 and are secured in any suitable manner to the main support plate 30. As will be obvious from examination of FIGURE 1, they pass through appropriate openings (not shown) in plate 30 into the hydraulic cylinder flange 40 and through the flange 40 to be secured thereto by the nuts 41 and lock washers 42.

The plate 30 is in turn supported on the frame which includes the legs 45. A hydraulic cylinder 51 for driving the plunger 50 in the manner and for the purposes hereinafter described, is secured by members 31, 41 and 42 on the main base plate 30. The plunger 50 is attached to the ram of the hydraulic mechanism 51 and may be operated downwardly into the die 10 to press material therein, and may be withdrawn by a reversal of the hydraulic mechanism 51 to permit additional material to be introduced into the die 10. The plunger 50 is, of course, of such diameter that it will clear the opening 22 (FIGURE 4) in the die clamping plate 15 and enter the die 10 to compact material therein against the frictional force exerted on the compact by the die.

The compacting operation at the initial stage for any given rod, bar or length will be described shortly. Assuming now that the compacting operation has previously been going on to the extent that compacted material is beginning to emerge from the bottom of the die 10 and the die support plate 14; additional material to be compressed is added at the top of the die, the plunger 50 is moved downward by the hydraulic mechanism 51 compressing the compact, the oil pressure in the operating cylinder of the hydraulic mechanism 51 begins to rise as the plunger 50 continues to compact the material until the entire mass of compacted material overcomes the frictional engagement of this mass with the side of openings 12 of the die and the compacted material in the die 10 starts to slide through the die. At this point, the plunger 50 still continues to move down extruding a portion of the compact through the bottom of the die 10 until the pressure in the cylinder of hydraulic operating mechanism 51 drops to a predetermined pressure. This drop in pressure to a predetermined level is utilized, as hereinafter explained in connection with FIGURE 9, to reverse the operation of the hydraulic mechanism 51 and the plunger 50. The plunger 50 is then raised until a limit switch 52 (hereinafter described in connection with FIGURE 9) engages the plunger flange 53 to reverse the plunger for the next downward operation. An additional increment of material to be compressed which was fed to the funnel guide during the previous stroke falls in at the top of the die as soon as the plunger 50 clears the top of the die, and the plunger 50 is operated down again where the operation of compacting the additional increment of material is repeated. Again the plunger compacts the additional material with the original compact and builds up pressure until the entire mass once more begins to slide and be extruded; whereupon, once more, the sliding of the mass, causing a drop in pressure, results in operation of the pressure switch, hereinafter described, to reverse the plunger 50.

At the initiation of the operation when the die 10 is completely empty, it is necessary, in order to start the compacting operation, to plug the bottom of die 10 in any suitable manner until a compress of sufficient density and size in the die 10 has been formed. Thereafter, the plug may be removed as the compressed material in the die now begins to serve the purpose of maintaining controlled back pressure.

One of the important aspects of the present invention, therefore, is that the die 10 is rigidly stationarily mounted and has no moving parts or moving supports. Consequently, the die 10 and its associated elements may be enclosed in a limited access chamber which may be subjected to any desired atmosphere and which may be, if desired, partially or wholly evacuated with complete assurance that no adjustment of the die or any of its operating elements will necessitate entering the chamber. This is so because the die has no operating elements which move and is not supported in any way on elements which must have motion or adjustment. Further, the die requires no cleaning to maintain good operation.

An additional and important element of this invention is the means provided for interlocking the individual compressed segments to form a unified whole. Ordinarily in making rods, bars or lengths of compacted material, the material must be treated as it emerges from the die by sintering or by any other process which will complete the integration thereof, since the protruding length is not inherently self-supporting. By making the end 60 of the plunger 50 wedge shaped, as shown in FIGURES 1 and 8, I provide a means for interlocking the individual charges of compressed material and thereby producing an extrusion of compacted material which is inherently self-supporting and does not require the immediate performance of an additional operation to make it self-supporting.

In addition, as previously pointed out, an inverted cone frustum or a right cylinder having substantial clearance with respect to the die may be used. More irregular shapes do not confer added advantage.

In order to appreciate the value of the wedge, an explanation of its features will help. There are two ways in which the wedge causes the increments to stick together. One is the friction force against the side walls impressed in the previously formed compact by the tapered walls of the tip. The other is the compacting of the charge, against an area of only partially compressed material, i.e. the segments at the sides of the wedge tip. When metallic sponge, for example, is compressed to a high pressure, it will not adhere to a further compacting of sponge against it, unless of course, this additional sponge is compressed with much larger pressures. When the tip of the wedge presses a charge of sponge, the sponge under the tip gets compressed while the sponge on the sides merely rides down. As the charge is increased, this effect is diminished because of the increased ratio of charge height to wedge dimensions. Therefore, it is only a matter of degree as to how soft these edges are; the softer they are, the more amenable they are to interlocking with the following charge.

When a cylindrical tip is used, this interlocking effect is noticed around the clearance annulus and with an inverted frustum of a cone, the effect occurs in the annulus outside of the conical protrusion.

Consequently, I have found that the only limitation on the length of the extruded compact is the height of the die 10 from the floor or other base on which the mechanism stands; and in actual practice I have produced compact of zirconium sponge extending from the bottom of die 11 to the floor where the plate 30 was at a height of 72 inches from the floor and the bottom of plate 14 was approximately 32 inches below the plate 30. An examination of these compacts, which were of the order of 40 inches in length, showed that there was virtually no limitation on the length of the compact which could be produced, provided that the compact was handled in any reasonable manner, keeping in mind the fact that it was a compact rather than an otherwise solidified material.

Additional operating elements may be provided in connection with this device. For instance, a pulverized material feed 65 may be provided having any appropriate construction already known in the art, and having an outlet tray or spout 131 terminating at the funnel guide 67 secured to the top of clamping plate 15. Funnel guide 67 as seen in FIGURE 7 is essentially a cylindrical member having a funnel shaped central area communicating with an opening in the bottom, not shown, which registers with hole 22 of clamping plate 15 through which the material may enter the top of guide 10. Funnel guide 67 may also have a plurality of ribs 70 supporting a guide ring 71 for plunger 50 in alignment with the opening 22 of plate 15.

Such automatic feeding may be accomplished as shown in FIGURE 1 (as controlled in accordance with the control circuit hereinafter described in connection with FIGURE 9). In FIGURE 1, the feed mechanism 65 is shown as comprising a hopper 120 into which the feed material is placed. The feed is free to flow and piles up in the vibrator feeder 121. When the vibrator is energized, the feed travels the length of the feeder and overflows at the open end 122 into a three pocket feed wheel 123. The feed wheel is supported on a freely rotating axle 124 which in turn is supported by balance beam 125 and fulcrum 126. The counterbalance 127 is adjusted so that beam 125 will tip down on the right against stop 128 when the desired charge for an increment of feed is in the feed wheel 123.

Because of the offset nature of the pockets, the feed wheel 123 will rotate clockwise after it has been loaded sufficiently to overcome the counterweight 127 and dropped to the lower position where balance beam 125 is against stop 128. The feed wheel is prevented from rotating in the upper position because pin 129 on the side of the wheel 123 engages stop 130 which is fastened to the frame of the whole assembly.

When feed wheel 123 rotates, its charge is dumped into funnel guide 67 by means of chute 131. As the feed is dumped, the balance beam 85 tips with its right up against stop 132. Pin 129 now engages stop 130 and prevents the wheel from turning further until it is loaded and clears the stop. Leaf spring 133 is mounted on support 134 to guide the pin to stop 130 and then snap up behind the pin to prevent it bouncing back. The vibrator is controlled in accordance with the electrical circuit hereinafter described in connection with FIGURE 9.

The extruded compact may be given special conformations at the ends as well as at segments intermediate the ends, as long as these special conformations do not exceed the diameter of the extrusion.

Thus, for instance, a thread may be formed at either end by inserting a small plug containing a hardened length of threaded bolt stock into the die with the sponge fines. When the bar is removed from the die the plug may then be unscrewed from the end thereby leaving the thread in the compact. Similarly, by utilizing a split plug die, threads or other special conformations and shapes may be molded in the extrusion intermediate its ends; that is, when a desired length of the extrusion has been compacted, the split plug die may be inserted through the top of die 10. The addition of material to be compacted and the successive compacting steps may then proceed as previously described. When the compacted extrusion emerges from the bottom of the die, the split plug die may be removed leaving the special thread or other conformation corresponding to the interior which the shape of the plug die and this special thread or other conformation will be located at the desired point intermediate the ends of the bar.

Obviously, the concept of the present invention also includes the operation thereof with the die in a horizontal position to produce extrusions which are not limited in length by the height of the bottom of the guide above a base or floor.

In FIGURE 9 I have shown a simplified schematic circuit diagram for operation of the device of the present invention. It must be remembered that the operation requires moving the plunger 50 down while the pressure behind the plunger rises until the compact begins to slide when the pressure begins to drop; utilizing a drop in pressure to a predetermined level to cause a reversal of the plunger, and utilizing the rise of the plunger to a predetermined height to cause the plunger to come down again.

With these operation factors in mind, I provide the hydraulic mechanism with a pump starting coil C which will maintain the hydraulic pump in operation while the switch operator 80 is either on the automatic contact 81 or the hand-operated contact 82.

When the switch member 80 is on the automatic contact 81, a circuit is continuously made through the hydraulic pump starter from terminal L-1 to terminal L-2.

When the switch operator 80 is on the contact 82, then the operation is subject to manual control by means of push button switches 83 and 84. The closing of push button switch 83 will establish a circuit by means of bridge contact 85 across contacts 86 and 87 to connect the hydraulic pump starter C across the terminals L-1 and L-2. At the same time, bridge contact 88 will close the circuit across contacts 89 and 90 across the hydraulic ram "up" control 91, connecting this "up" control across the terminals L-1 and L-2. This will operate the plunger 50 in the up direction. The hydraulic pump starter C, the up control 91 and the down control 92 are elements supplied with the standard hydraulic ram 51 and need no further description here.

Similarly, with the switch 80 on contact 82, operation of the down push button 93 will close bridge contact 94 across contacts 95, 96 to operate the hydraulic pump starter while bridge contact 97 will close across contacts 98 and 99 to operate the down control 92.

For automatic operation, a movement of the switch operator 80 to the automatic contact 81 cuts the manually operated push buttons 83 and 84 out of the circuit. Instead the hydraulic pump starter C is continuously energized from L–1 to L–2 through switch contacts 81 and 80.

Relay 1 designated R–1 controls the contacts designated R–1A and R–1B. Contacts R–1A and R–1B are normally open. The relay R–2 contacts R–2A and R–2B are normally closed.

Taking the position of the elements shown, with contacts R–1A and R–1B open, the pressure switch contact arm 100 on contact 101 and the limit switch 102 closed, a circuit in parallel with the circuit through the hydraulic pump starter C is established from terminal L–1, switch 80, contact 81, normally closed relay contact R–2A through the down control for the ram 92 to terminal L–2. The plunger 50 is moving down.

Since relay contact R–1B is normally open, relay R–2 is not energized and since relay contact R–1A is normally open, relay R–1 is not energized. As pressure builds up in the hydraulic cylinder of the hydraulic ram 51, pressure switch contact arm 100 engages contact 103.

A circuit is now established from terminal L–1 through contacts 80 and 81, the closed limit switch 52, pressure switch contacts 100 and 103, through normally closed relay contacts R–2B to the solenoid valve 104 of the hydraulic ram to terminal L–2.

Referring to the hydraulic circuit diagram of FIGURE 10, valve 104 is normally open while 104a is a throttling valve. Valve 104 is energized when the pressure switch 100 is actuated. This occurs just before the compact starts to slide. Thus, the oil passage through valve 104 is closed, and all the oil to the cylinder must go through throttling valve 104a. This condition remains until R–2 is energized at the bottom of the stroke. Thus 104a controls the rate at which the compact slides through the die. This is important when the compact is being fed to another operation, such as melting, where a controlled feed is essential. When the cylinder reverses, 104 is de-energized so the oil exhausting from the cylinder will not be throttled on its way to the tank.

Returning now to the description of FIGURE 9, when the pressure switch arm 100 engages contact 103, a circuit is established from contact 103 and lead 105 to energize relay R–1. This results in closing the relay back contact R–1A to maintain relay R–1 energized and closing contact R–1B. The closing of contact R–1B now permits the pressure switch on drop in pressure which occurs when the compact slides through the die, when it moves back to contact 101, to close the circuit through contacts 100 and 101 and relay contact R–1B to the up control 91 of the hydraulic operating mechanism and the plunger 50 now moves up.

Contacts R–1B and R–1A remain closed because relay R–1 is energized until the plunger reaches the top of its stroke. At this point limit switch 52 is opened by engagement thereof with guide 53 of FIGURE 1, and the up control 91 of the ram relay R–1 and relay R–2 are de-energized and the plunger comes to a stop.

Owing to the de-energization of relay R–2, contact R–2A closes to energize the down control and the operation is repeated.

Where automatic feed control is desired, it is controlled by the relays R–3, FIGURE 9. When the switch 80 is turned to automatic, (81) the vibrator is energized through limit switch 52 and normally closed contacts of relay R–3C. When the proper charge is in the feed wheel and beam 125 is tipped, limit switch 136 is actuated, energizing relay R–3 through contact 137. This opens R–3C stopping the vibrator feed. It also closes R–3A locking relay R–3. As soon as the charge has dumped, limit switch 136 returns to position 138, energizing R–4 through R–3B which is now closed. Limit switch 52 is actuated when the plunger reaches the top of its stroke causing relays R–3 and R–4 to be released, energizing the feeder and another cycle is started.

Should the feeder become empty or the hopper choked, or for some reason the action delayed so that the feed initiated at the beginning of one stroke is not completed and dumped into the funnel guide 67 by the time the plunger has returned to the top of its stroke, R–4 would not have actuated. In this case normally closed contact R–4A which bypasses limit switch 52 would keep relays R–1, R–2 and R–3 energized, preventing the plunger from reversing, thus stopping the movement of the hydraulic ram in its upper limit position.

Relay R–3 must be a slow release relay so that in normal operation (in which the feeding and dumping is completed in due time) it will not possibly release ahead of relays R–1, R–2 and R–3, thereby inadvertently locking them and stopping the ram action. An alarm can also be added as shown in FIGURE 9, so that when limit switch 52 contacts 110, the alarm is energized through R–4B, a normally closed contact.

The solenoid control valve 104, the up control 91 and the down control 92 of the hydraulic mechanism 51 and the pump starter C have not been specifically described since they are well known parts of a well known mechanism.

The controls of the feed device 65 which may be vibratory or gravity or both, have not been specifically described since they are well known devices in the field of this invention.

The schematic diagram of FIGURE 9 has been included only to show one method of alternative manual or automatic control. Within the limits of the invention as herein described, other methods may as readily be used to perform the operations described for the apparatus of FIGURES 1 to 8.

In the foregoing the invention has been described in connection with illustrative embodiments thereof; since many variations and modifications of this invention will now be obvious to those skilled in the art, I prefer to be bound not by the specific embodiments herein set forth, but only by the appended claims.

What is claimed is:

1. A compacting device comprising a rigidly mounted stationary longitudinal die; said die being provided with a continuous passage from one end to the other thereof, said passage being eccentrically located within said die and said die being provided with a slit parallel to the axis thereof and extending from said passage to the periphery of said die substantially at the point of minimum wall thickness; means for compacting successive charges of compactible material in said die, each charge being compacted against and into engagement with a prior compacted charge at a pressure beyond a predetermined level and the frictional engagement of the prior compacted charge with the wall of the die providing support for the compacting pressure; means responsive to a drop of compacting pressure to said predetermined level, occasioned by the sliding of the compacted material with respect to the wall of the die, for reversing the movement of said compacting means and withdrawing the same from said die; said die being constructed of inherently rigid and resiliently deformable material, the eccentric location of the die passage and the slit in the die wall at the point of minimum thickness permitting the wall of said die to exert controlled frictional pressure upon successively compacted charges which emerge from said die as a continuous compacted member.

2. A compacting device comprising a rigidly mounted stationary longitudinal die; said die having a resilient inner boundary defining a continuous passage from one end to the other of the die; means for compacting successive charges of compactable material in said die; each charge being compacted at a pressure beyond a predetermined level against and into engagement with a prior compacted charge; the frictional engagement of prior compacted charges with the wall of the die providing support for the compacting pressure, the compacted charges sliding with respect to the wall of the die; pressure responsive means associated with the die and responsive to the drop of compacting pressure to said predetermined level, due to the sliding of the compacted charge, for withdrawing said compacting means from said die; the successive compacted charges being integrated by the compacting operation in said die and emerging from said die as a continuous compacted member.

3. A compacting device comprising a digidly mounted stationary longitudinal die; said die having an inner boundary defining a continuous passage from one end to the other of the die; means for compacting successive charges of compactable material in said die; each charge being compacted at a pressure beyond a predetermined level against and into engagement with a prior compacted charge; the frictional engagement of prior compacted charges with the wall of the die providing support for the compacting pressure, the compacted charges sliding with respect to the wall of the die means responsive to the sliding of the compacted charge, and the drop of compacting pressure to said predetermined level, for withdrawing said compacting means from said die, the successive compacted charges being integrated by the compacting operation in said die and emerging from said die as a continuous compacted member; said die having a longitudinal slit substantially parallel to the axis of said die and communicating from the interior wall of said die to the exterior; said die being constructed of substantially rigid but resiliently deformable material; said slit permitting the wall of said die to exert controlled frictional pressure upon compacted charges in said die.

4. A compacting device comprising a rigidly mounted stationary longitudinal die; said die having an inner boundary defining a continuous passage from one end to the other of the die; means for compacting successive charges of compactable material in said die; each charge being compacted at a pressure beyond a predetermined level against and into engagement with a prior compacted charge; the frictional engagement of prior compacted charges with the wall of the die providing support for the compacting pressure, the compacted charges sliding with respect to the wall of the die means responsive to the sliding of the compacted charge, and the drop of the compacting pressure to said predetermined level, for withdrawing said compacting means from said die, the successive compacted charges being integrated by the compacting operation in said die and emerging from said die as a continuous compacted member; said die having a longitudinal slit substantially parallel to the axis of said die and communicating from the interior wall of said die to the exterior; said die being constructed of substantially rigid but resiliently deformable material; said slit permitting the wall of said die to exert controlled frictional pressure upon compacted charges in said die; said slot being of substantially V-shaped cross-section having its longitudinal apex at the inner wall of the die.

5. A compacting device as set forth in claim 1 in which said last mentioned surface is formed by a wedge projecting from the end of the compacting ram.

6. A compacting device as set forth in claim 1 in which said last mentioned surface is formed by cone frustum projecting from the end of the compacting ram.

References Cited in the file of this patent

UNITED STATES PATENTS

| | | |
|---|---|---|
| 1,348,669 | Talbot | Aug. 3, 1920 |
| 2,289,787 | Kaschke et al. | July 14, 1942 |
| 2,425,237 | Field | Aug. 5, 1947 |
| 2,558,823 | Crowley et al. | July 3, 1951 |
| 2,749,590 | Kilpatrick | June 12, 1956 |
| 2,799,045 | Hillegas | July 16, 1957 |
| 2,844,845 | Krall | July 29, 1958 |
| 2,902,714 | Johnson | Sept. 8, 1959 |